United States Patent [19]

Deuter et al.

[11] 3,762,847

[45] Oct. 2, 1973

[54] APPARATUS FOR MAKING A MOLDED ELECTRICAL STRUCTURE

[75] Inventors: Thomas F. Deuter, Jonesboro, Ark.; Dean E. Shaffer, Fort Wayne, Ind.

[73] Assignee: General Electric Company, Fort Wayne, Ind.

[22] Filed: Sept. 15, 1971

[21] Appl. No.: 180,728

[52] U.S. Cl.................. 425/125, 29/596, 425/129, 425/243, 425/245, 425/812, 425/DIG. 228
[51] Int. Cl............................................. B28b 3/10
[58] Field of Search.................... 425/125, 129, 817, 425/243, 245, 812, DIG. 228; 29/596

[56] References Cited
UNITED STATES PATENTS

| | | | |
|---|---|---|---|
| 3,543,349 | 12/1970 | Marocco | 425/129 |
| 3,568,247 | 3/1971 | Lunn | 425/129 |
| 2,975,481 | 3/1961 | Kauffman | 425/812 UX |
| 2,875,472 | 3/1959 | Marcus | 259/68 |
| 3,233,288 | 2/1966 | Strauss | 425/190 |
| 3,231,656 | 1/1966 | Ninneman | 425/243 |

*Primary Examiner*—H. A. Kilby, Jr.
*Attorney*—Joseph B. Forman et al.

[57] ABSTRACT

Apparatus and method for making a molded composite structure which comprises a core and coil assembly and a substantially rigid interstitial agglomerate mass of particulate material secured together and to the assembly by a hardened matrix, the mass forming a protective covering for at least part of the core and coil assembly. The apparatus includes a first mold part for accommodating at least part of the core and coil assembly, a second mold part, and mechanism for opening and closing the mold parts to selectively define a substantially closed cavity. The apparatus includes a molding composition passageway or gate communicating with the cavity. A filling tube communicates with the gate, and means are provided to rapidly force a molding composition under pressure into the closed cavity at a substantially constant, uniform rate and maintain pressure on the material within the cavity during hardening of the matrix portion of the structure. The mold parts are heated to harden the matrix portion of material within the closed cavity, while the gate region is cooled, as by circulating cooling water through coolant passages, to maintain the composition flowable and matrix former unhardened in the tube. Vents formed in the cavity provide the desirable result of reducing the occurrence of articles considered defective because of relative separation of molding composition constituents and incomplete mold cavity filling. Disclosed method includes subjecting a molding composition to a relatively low thermal state environment, and thereafter subjecting a mass of the composition to a relatively elevated thermal state environment while moving the material at a relatively high and substantially constant rate of speed into a closed mold cavity, holding the composition in the closed cavity until a characteristic temperature of at least one of the materials in the molding composition is reached within the closed cavity and thereafter opening the mold cavity, and then removing a structure from the cavity.

6 Claims, 23 Drawing Figures

United States Patent [19]
Deuter et al.
[11] 3,762,847
[45] Oct. 2, 1973
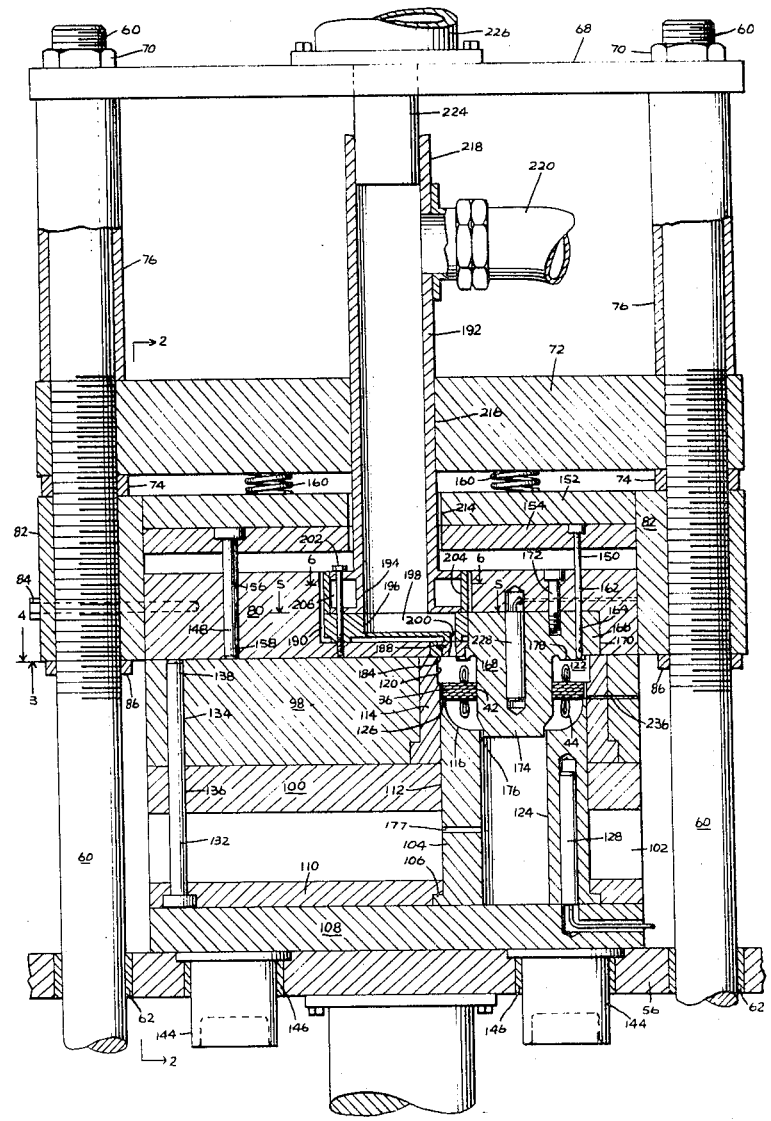

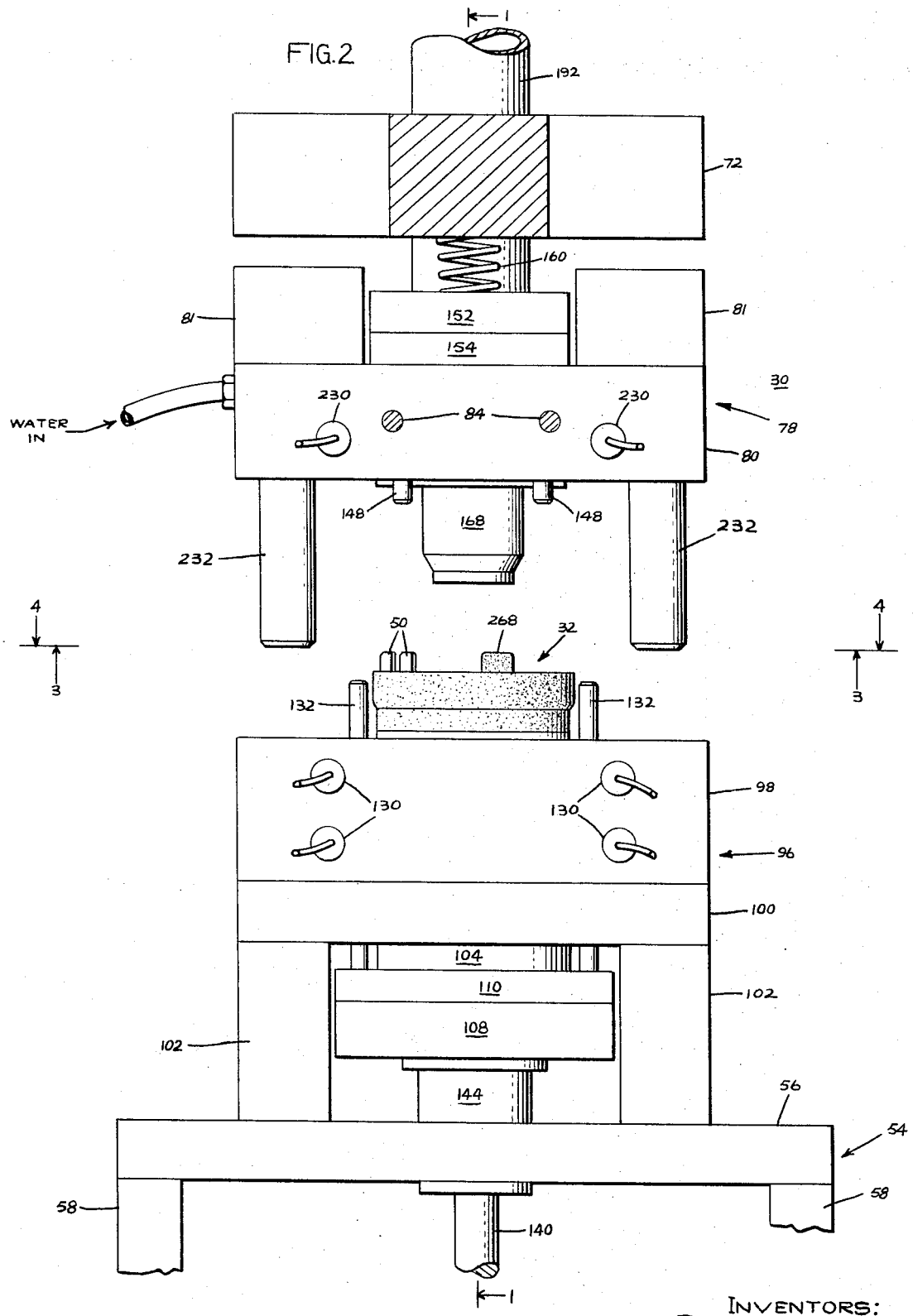

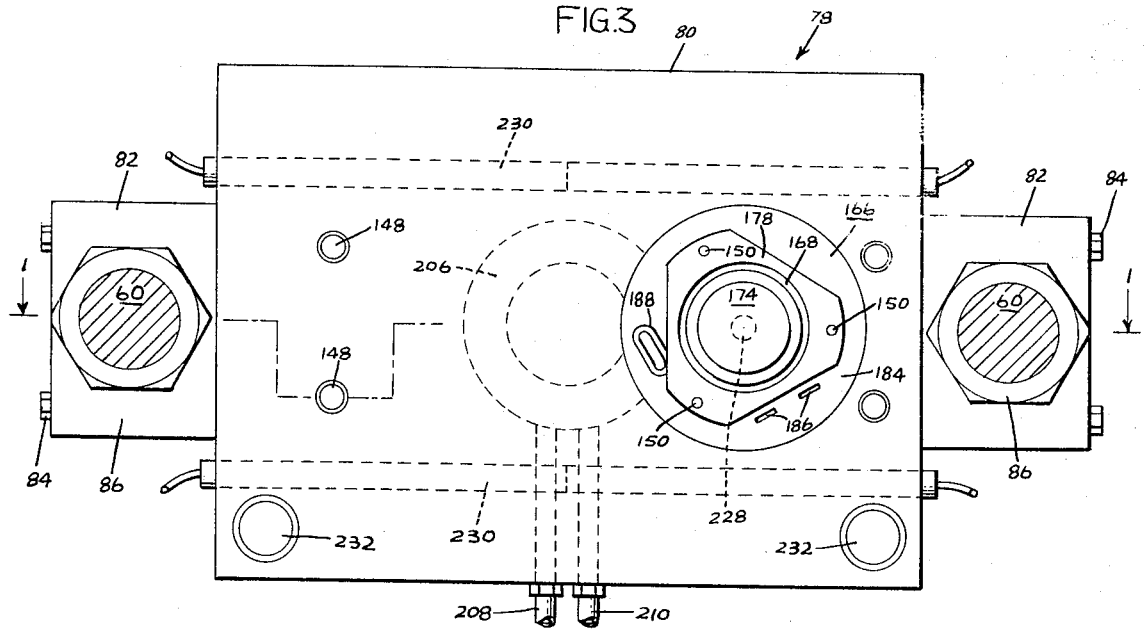
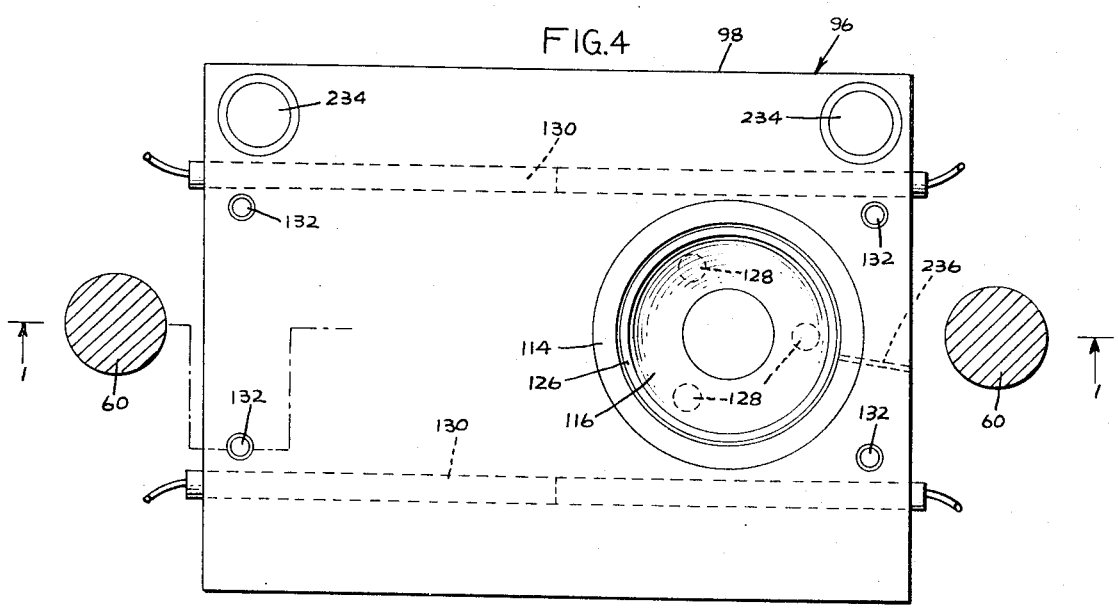

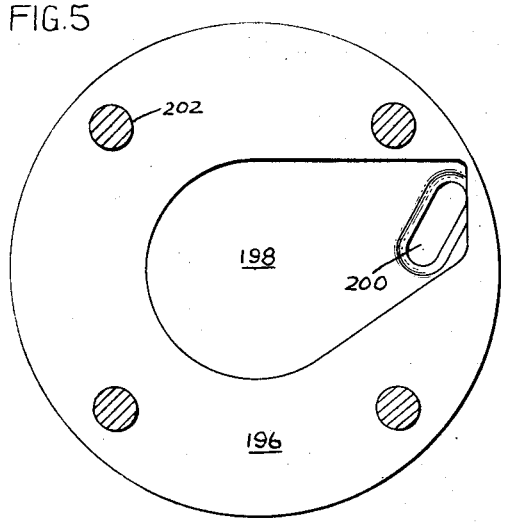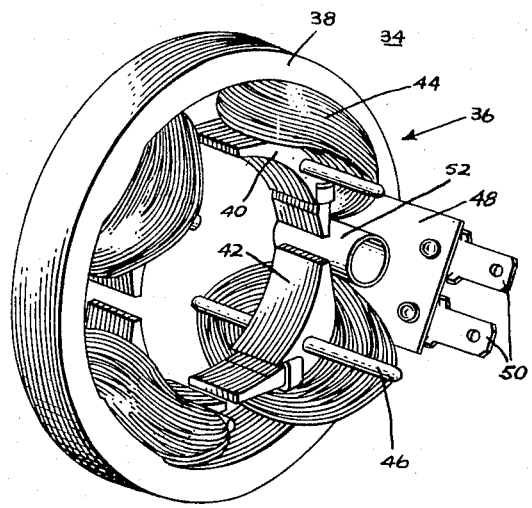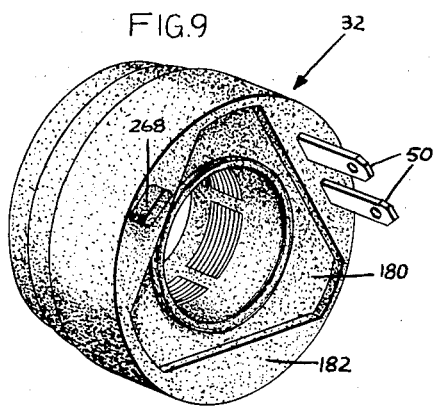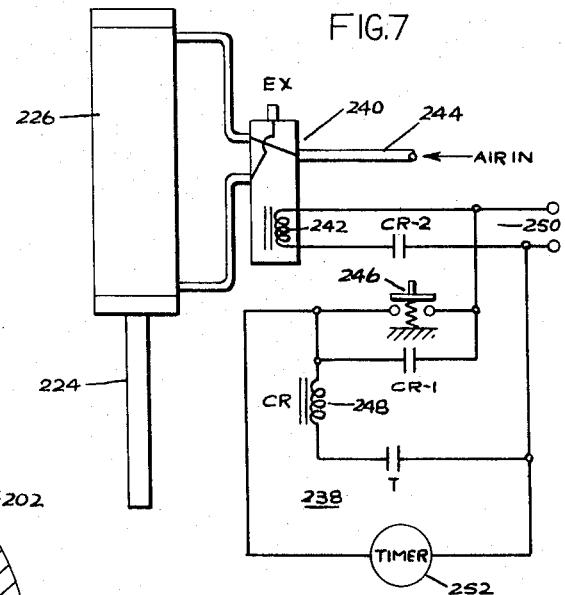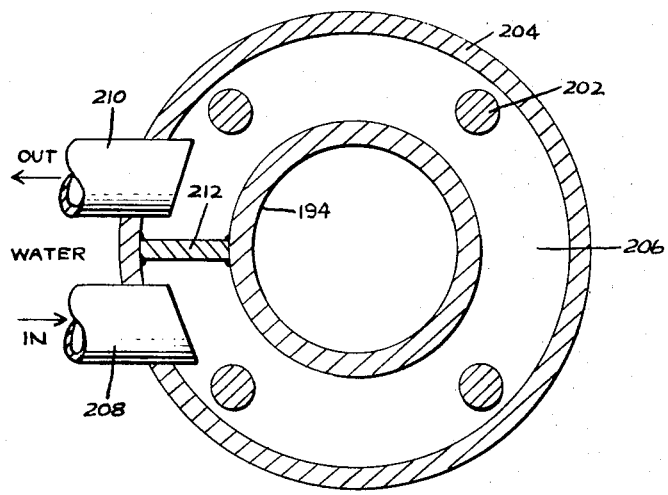

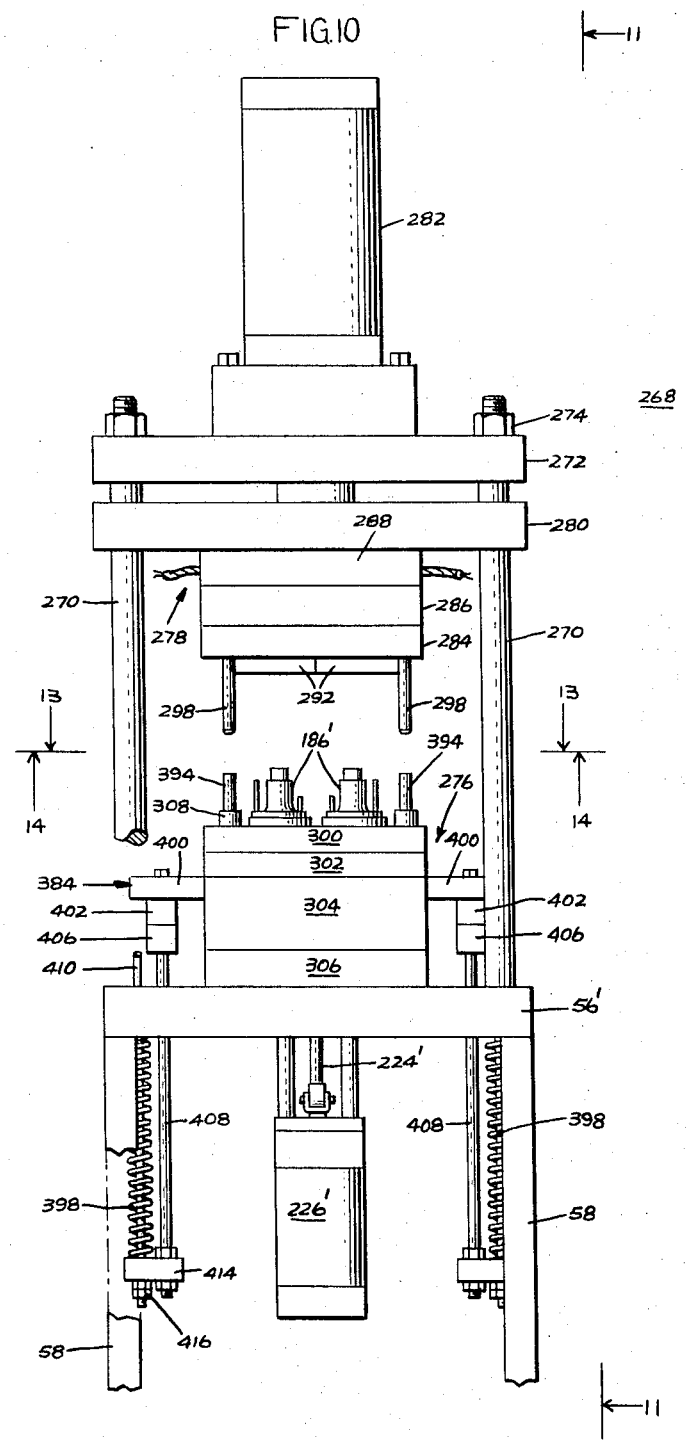

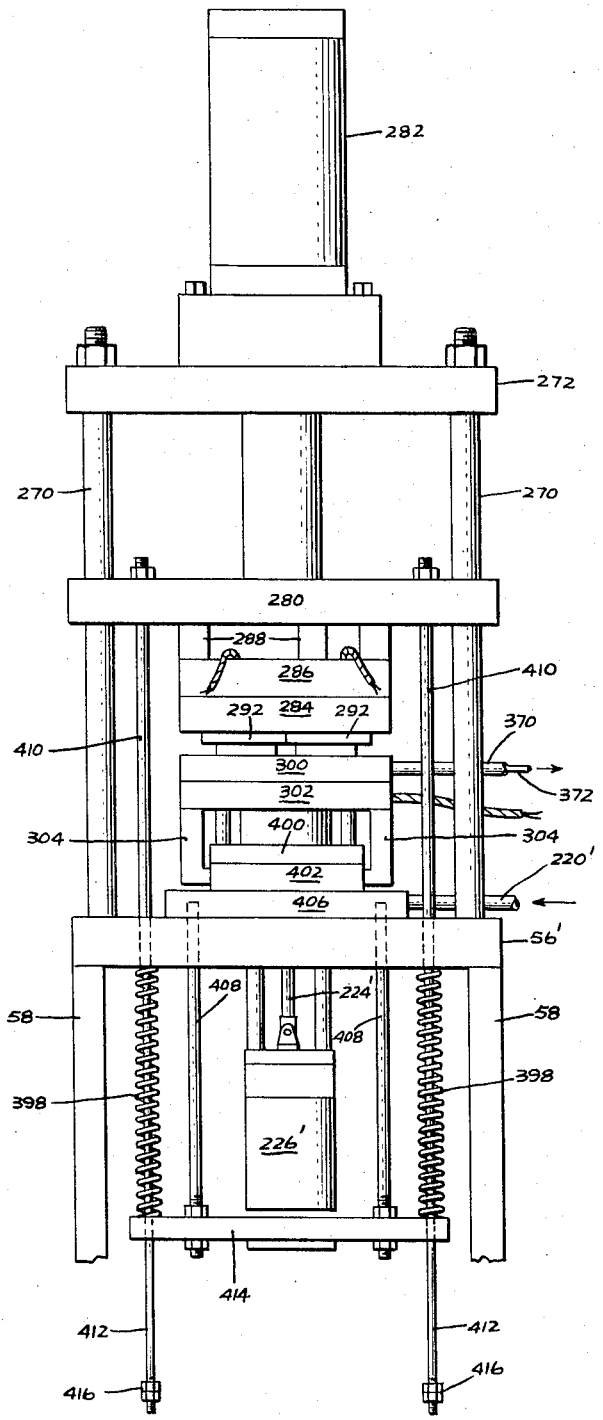

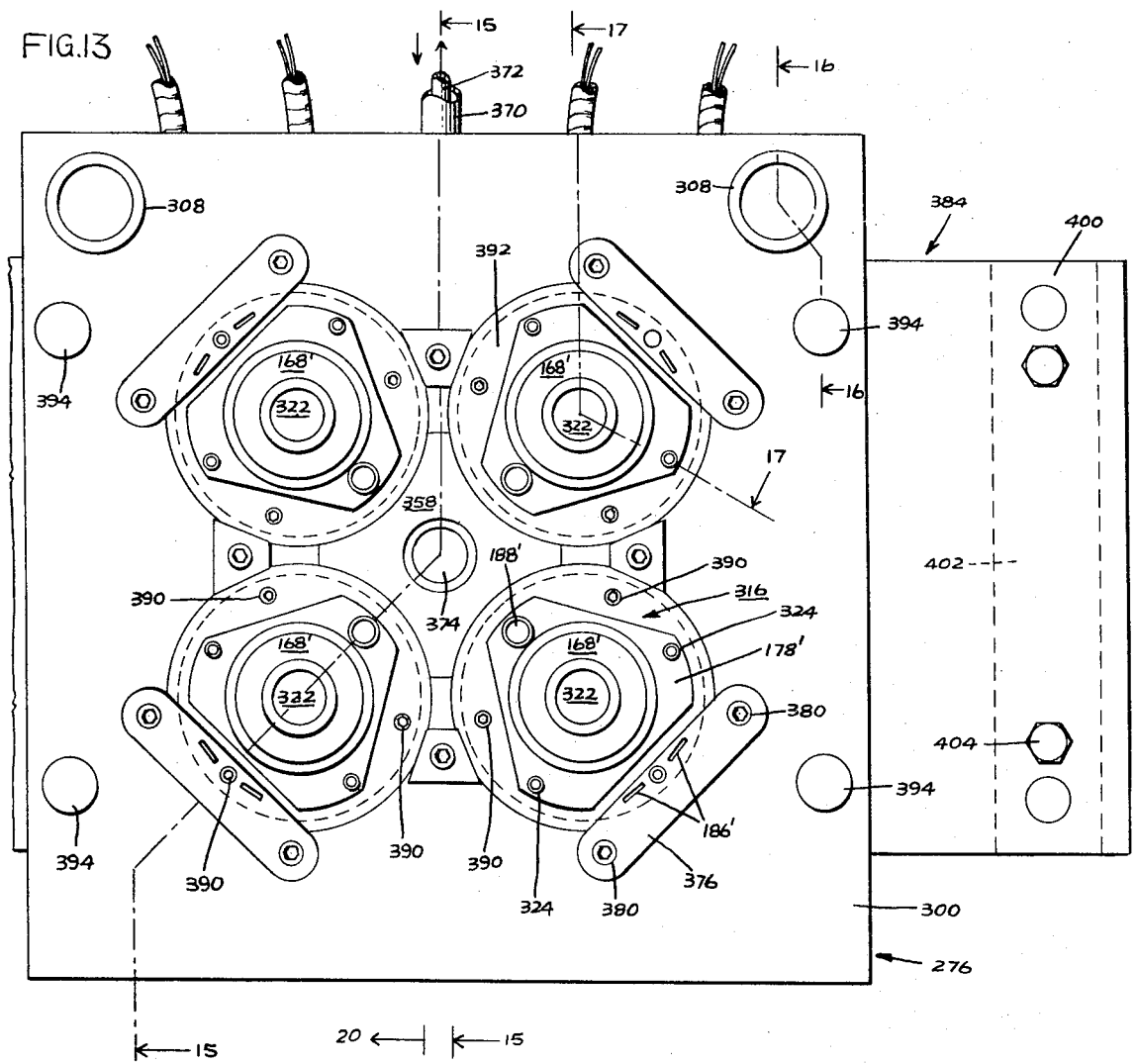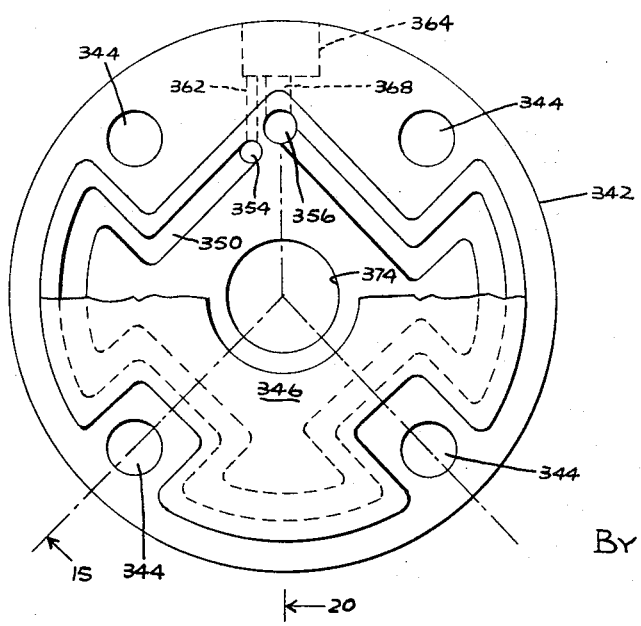

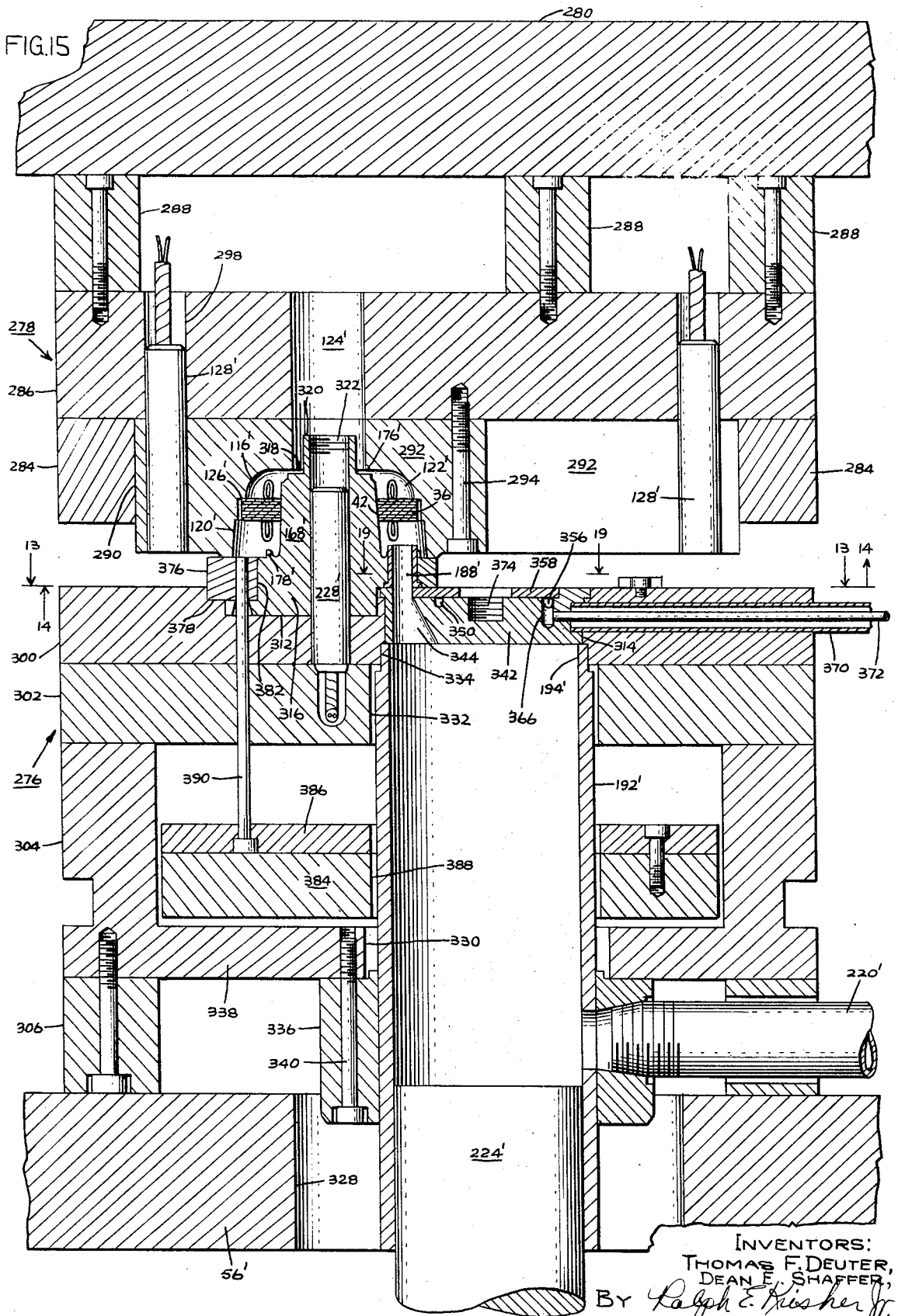

INVENTORS:
THOMAS F. DEUTER,
DEAN E. SHAFFER
BY Ralph E. Krisher Jr.
ATTORNEY.

APPARATUS FOR MAKING A MOLDED ELECTRICAL STRUCTURE

CROSS REFERENCE TO RELATED APPLICATIONS

Dochterman et al. U.S. Pat. application Ser. No. 6,666, filed Jan. 29, 1970 and a U.S. Pat. application titled "PRESSURE MOLDED ARTICLES, COMPOSITION, AND METHOD OF MAKING SAME," Ser. No. 180,770 and filed concurrently herewith are related applications.

BACKGROUND OF THE INVENTION

This invention relates generally to apparatus and methods for making molded composite structures and more particularly wherein at least part an electrical coil and core assembly comprise part of the sturcture and where at least part of the coil is embedded in a substantially rigid pressure molded mass of an agglomerate structure.

It is usually desirable to protect electrical apparatus, such as dynamoelectric machines, transformers, reactors and the like, and particularly the coils, internal electrical connections, and external electrical leads of such apparatus from mechanical, e.g., impact damage during storage, shipment and use. It is also normally desirable to protect such apparatus from adverse environmental conditions such as high humidity, and/or corrosive or explosive atmospheres. Still further, it is frequently desirable to suppress or attenuate noise generated during operation of the apparatus. Finally, it is desirable, if not necessary, to provide for dissipation of internal heat generated during operation of the apparatus.

To accomplish one or more of the foregoing objectives, such electrical apparatus has commonly been housed in metal enclosures. Such metal enclosures have been either formed or cast, have often comprised several component parts, and yet have not necessarily satisfactorily provided all of the above stated desirable characteristics. This was particularly true with respect to dissipation of heat and structural integrity. However, approaches taken heretofore have contributed appreciably to the overall cost of enclosed apparatus.

Core and coil assemblies of electrical apparatus have been surrounded by a mass of hardened insulating material, such as a cured epoxy resin. An example of this approach is taught in the commonly assigned Dochterman U.S. Pat. Re. No. 24,909; Avila et al. U.S. Pat. No. 3,002,261; and Thompson et al. U.S. Pat. No. 3,165,816. Those approaches, however, have not been adopted in practice for a variety of reasons including the cost of such insulating materials compared with the cost of formed or cast metal, the propensity for such materials to shrink during molding and/or to crack due to thermal stresses, and particularly since such materials generally have relatively poor thermal conductivity and thus do not effectively dissipate heat generated during operation of the apparatus.

In U.S. Pat. application Ser. No. 6,666, filed Jan. 29, 1971 in the name of Richard W. Dochterman and Michael E. Wendt, and assigned to the assignee of the present application, there is described, inter alia, a dynamoelectric machine wherein the core and coil assembly is embedded in a rigid interstitial mass of inert particulate material, e.g., as sand, the particles thereof being secured together and to the assembly by a hardened resinous material, the mass forming a protective enclosure for the assembly. The disclosure of that application is, accordingly, specifically incorporated herein by reference. In addition, the disclosure of an application titled "PRESSURE MOLDED ARTICLES, COMPOSITION, AND METHOD OF MAKING SAME" U.S. Pat. Ser. No. 180,770 is also incorporated herein by reference. That application is filed in name of Thomas F. Deuter.

It has been found that the head dissipation characteristics of dynamoelectric machines embodying the Dochterman et al teachings are measurably improved as compared with conventional arrangements. Further, such machines possess structural integrity superior to conventional constructions and, of course, provide substantially complete resistance to adverse environmental conditions. Still further, such machines provide noise suppression characteristics equal to or better than those provided by conventional constructions.

The aforesaid Dochterman et al. application also discloses, inter alia, a method wherein a core and coil assembly is positioned in an open mold cavity; a mass of particulate material and unhardened resinous material is forced into the cavity around the assembly; and heat is then applied to the mass for a sufficient time to harden the mass.

While the above and other methods described and illustrated in the aforesaid Dochterman et al. application have produced satisfactory dynamoelectric machine stator structures, it would be desirable to provide apparatus and methods more particularly adapted for large quantity production usage and that contribute to still more predictable and uniformly satisfactory results. It is accordingly desirable to provide an apparatus and method for producing, in production quantities, a pressure molded structure which may include an electrical core and coil assembly at least partially embedded in an agglomerate mass comprising a rigid interstitial mass of inert particulate material secured together and to at least the assembly by a hardened matrix, the mass forming a protective enclosure for the assembly.

SUMMARY OF THE INVENTION

It is accordingly an object of the present invention to provide improved apparatus and methods for making a pressured molded article comprising an agglomerate structure.

Another object of the present invention is to provide an improved apparatus and method for making a composite electrical structure which includes a core and coil assembly and a rigid interstitial mass of inert particulate material with the particles thereof secured together by a substantially solid and rigid matrix.

A further object of the invention is to provide improved apparatus and methods for making articles that at least include an agglomerate structure, the apparatus and methods lending themselves to quantity production of commercially acceptable articles.

In carrying out the objects of the invention in one form, there is provided injection molding apparatus and methods whereby a blended pressure molding composition including a matrix former and particulate material may be pressure molded to form an agglomerate mass. In a preferred form, a molding composition is moved into a mold cavity, under pressure, around selected portions of a core and coil assembly without, however, damaging the coils or lead connections. By the practice of the invention, the molding composition will completely fill the mold cavity without the formation of voids, and the particulate material remains uniformly blended with the matrix former in the composition so as to avoid separation of constituents and resultant "resin-rich areas" that are particularly likely to crack.

In a preferred exemplification of apparatus various means are provided for rapidly moving a mass of molding composition through a cooled transition passageway and into a heated and substantially closed mold cavity at a substantially constant, uniform rate; maintaining the composition under pressure in the mold cavity until the temperature of the composition reaches a predetermined characteristic temperature; and opening the cavity to permit removal of molded structures therefrom. Also included are means for relieving internal mold cavity pressure at one or more locations while the molding composition is being moved thereinto.

By way of more specific description of one preferred form of apparatus, there is provided a first mold part having at least a portion thereof arranged to accommodate at least part of a core and coil assembly. A second mold part is provided together with means for relatively moving the mold parts, the second mold part having at least a portion thereof which may selectively define part of a substantially closed mold cavity. Also included is a gate in communication with a cavity defining surface for admitting a pressure molding composition to a mold cavity. A filling passage is also provided and a portion of the passage along which the composition moves is referred to as a transition passageway, the walls of which are cooled. The transition passageway connects the gate and filling passage. Means are also provided for heating the mold parts whereby the temperature of the molding composition may be quickly elevated to a preselected characteristic temperature within the mold cavity.

By a further aspect of the invention, an improved method includes preheating a core and coil assembly; positioning the core and coil assembly in at least part of a mold cavity; substantially closing the cavity; and forcing, at a rapid and substantially constant rate, a molding composition into the cavity while at least partially relieving internal cavity pressure; raising the temperature of the composition to a preselected temperature; opening the cavity; and removing a pressure molded structure from the mold. The method may also include the step of cooling at least a small predetermined mass of material while material is held in a transition region.

The subject matter which we regard as our invention is set forth in the appended claims. The invention itself, however, together with further objects and advantages thereof may be better understood by referring to the following more detailed description taken in conjunction with the drawings.

BRIEF DESCRIPTION OF THE DRAWINGS

FIG. 2 is an end elevational view, partly in cross-section, further illustrating the apparatus of FIGS. 1A and 1B;

FIG. 3 is a cross-sectional view taken generally along the line 3—3 of FIG. 2;

FIG. 4 is a cross-sectional view taken generally along the line 4—4 of FIG. 2;

FIG. 5 is a fragmentary cross-sectional view taken generally along the line 5—5 of FIG. 1A;

FIG. 6 is a fragmentary cross-sectional view taken generally along the line 6—6 of FIG. 1A;

FIG. 7 schematically illustrates a system for actuating the charging cylinder of the apparatus of the previous Figures;

FIG. 8 is a view in perspective of a dynamoelectric machine core and coil assembly adapted to have a housing mold therearound by the apparatus of FIGS. 1 through 7;

FIG. 9 is a view in perspective showing the completed structure molded by the apparatus of FIGS. 1 through 7;

FIG. 10 is a front elevational view, partly broken away, illustrating other apparatus embodying the invention in another form;

FIG. 11 is a side elevational view of the apparatus of FIG. 10 as viewed generally along the line 11—11 of FIG. 10;

FIG. 13 is a top view of the stationary mold part as viewed generally along the line 13—13 of FIG. 10;

FIG. 15 is a fragmentary cross-sectional view taken generally along the line 15—15 of FIGS. 13 and 14;

FIG. 19 is a top view, partly broken away, showing the manifold assembly as viewed generally along the line 19—19 of FIG. 15;

DESCRIPTION OF THE PREFERRED EMBODIMENTS

Figure 1A:
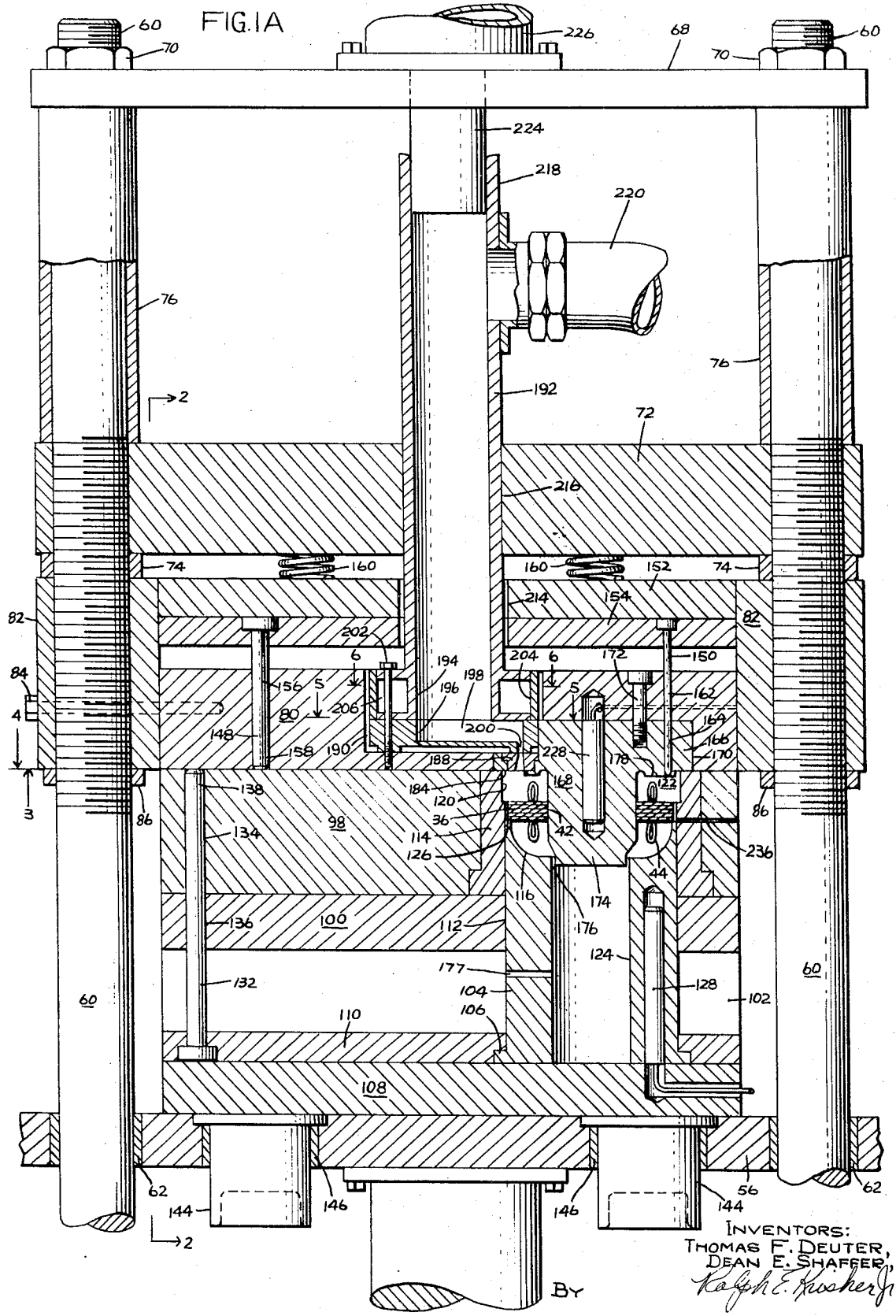
FIG. 1A is a side elevational view, partly in cross-section and partly broken away, illustrating a part of apparatus embodying the invention in one form.

Referring now to FIGS. 1 through 9 of the drawings, there is shown (FIG. 2), generally indicated at 30, injection molding apparatus for molding structure 32 (FIG. 9) which comprises dynamoelectric machine core and coil assembly 34 (FIG. 8) substantially embedded in a rigid, interstitial mass of inert particulate material bonded together and to assembly 34 by a solid matrix material, as will hereinafter be more fully described. Assembly 34 comprises stator core 36 formed of a stacked plurality of relatively thin laminations of magnetic material, core 36 comprising yoke portion 38 and inwardly extending salient poles 40 defining bore 42, although a non-salient pole stator core or rotor core could also be used. Conventional field coils 44 are disposed on poles 40, being held away from bore 42 by pins 46. Terminal board 48 carries external terminal prongs 50 to which coils 44 are connected. Tube 52 of insulating material wedges terminal board 48 in position between a pair of poles 40. It will be understood that core and coil assembly 34 is shown for illustrative purposes only.

Figure 1B:
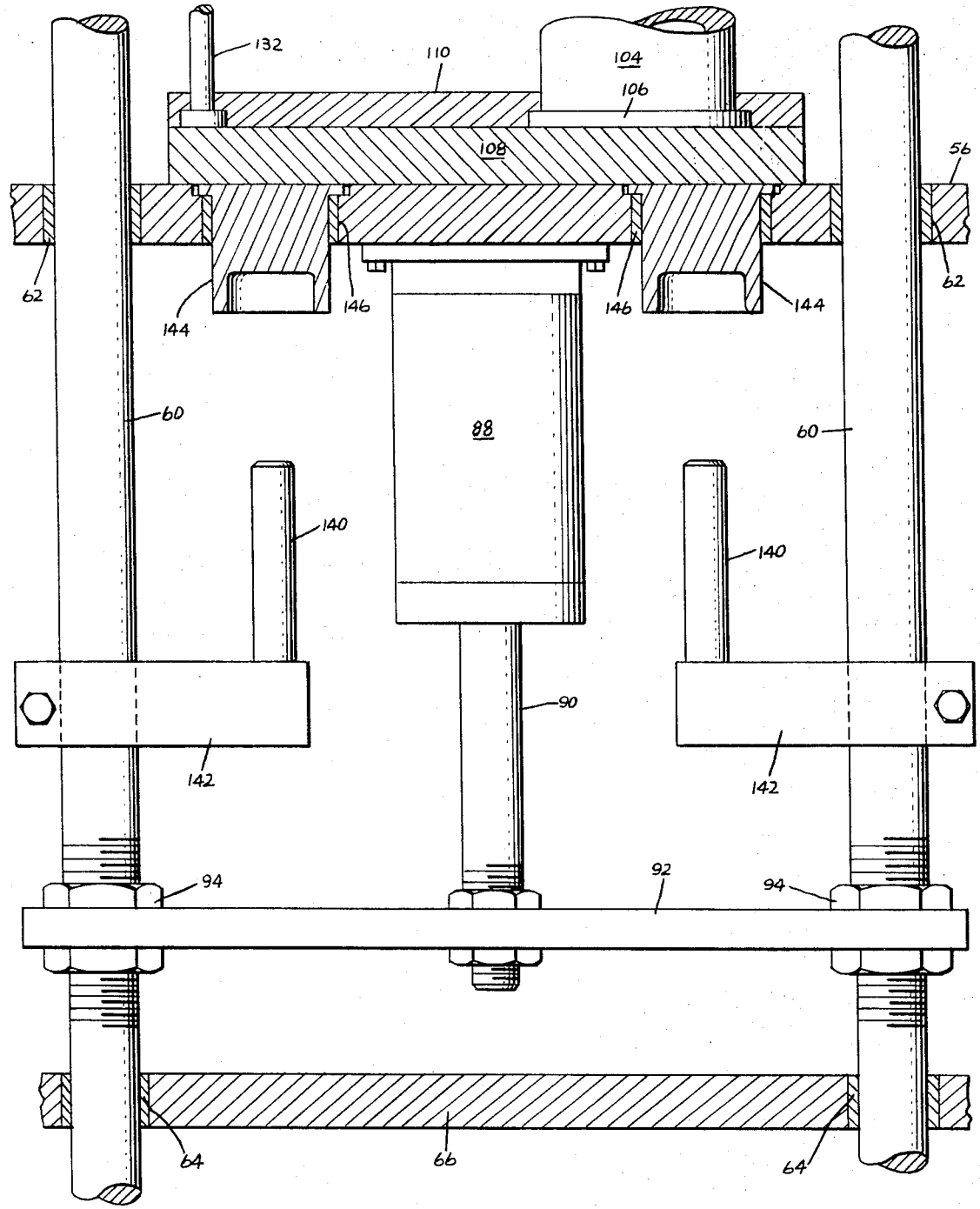
FIG. 1B is a side elevational view, partly in cross-section and partly broken away, illustrating the remaining part of the apparatus of FIG. 1A.

Apparatus 30 comprises rigid frame assembly 54 including press bed or lower platen 56 supported above a supporting surface (not shown), such as the floor, by legs 58. A pair of vertically extending rods 60 extend upwardly through bushings 62 in press bed 56 and bushings 64 in lower frame member 66 (FIGS. 1A, 1B). Member 68 extends between the upper ends of rods 60 and is secured thereto by threaded fasteners 70 (FIG. 1A). Upper press platen 72 spans rods 60 and is secured thereto by threaded fasteners 74 and sleeves 76 surrounding the upper ends of rod 60 and extending between platen 72 and member 68. Upper mold assembly 78 includes block 80 secured to upper press platen 72 by not shown threaded fasteners, members 82 being secured to block 80 by threaded fasteners 84 and movable with rods 60 as the upper mold assembly is moved. Threaded fasteners 86 may also be used to assist in locking the members 82 against fasteners 74. Spaced-apart side rails 81 are secured to the upper surface of block 80 (FIG. 2).

Upper platen 72 and upper mold assembly 78 are moved between an open position, as shown in FIG. 2, and a closed position, as shown in FIGS. 1A and 1B, by pneumatic cylinder 88 mounted on press bed 56 and having piston rod 90 secured to yoke member 92 which spans rods 60 and is secured thereto by threaded fasteners 94 (FIG. 1B).

Lower mold assembly 96 comprises blocks 98, 100 supported on press bed 56 by side rails 102. Mold plug 104 having flange 106 is supported on ejector plate 108 and retained thereon by plate 110. Mold plug 104 extends upwardly through opening 112 in block 100 and bushing 114 in block 98. The upper end of mold block 104 has upwardly facing curved surface 116 formed thereon. Surface 116 of mold plug 104 and wall 120 of bushing 114 respectively form the bottom and side walls of mold cavity 122 when the mold is closed, as shown in FIG. 1A. Mold plug 104 has central opening 124 therein communicating with surface 116. Upper edge 126 of mold plug 104 forms a ledge for supporting core 36 of core and coil assembly 34.

Electrical heating elements 128 are positioned in mold plug 114 and other electrical heating elements 130 are positioned in block 98.

Ejector pins 132 are supported on ejector plate 108 and retained by plate 100, pins 132 extending upwardly through openings 134, 136 in blocks 98, 100. Upper ends 138 of pins 132 are engaged by the lower surface of block 80 of upper mold assembly 78 as the upper mold assembly is lowered to the closed position thereby moving ejector plate 108, plate 110 and mold plug 104 to the lower position to form mold cavity 122, as shown in FIG. 1A. Ejector plate 108, plate 110, mold plug 104 and ejector pins 132 are raised to the upper position, as shown in FIG. 2, by a lost motion connection comprising pins 140 adjustably mounted on rods 60 by brackets 142 which engage cups 144 secured to ejector plate 108 and extending downwardly through bushings 146 in press bed 56 (FIG. 1B). It will be seen that such upward movement of mold plug 104 in response to upward movement of rods 60 to open the mold results in ejection of molded structure 32 from mold cavity 122, as shown in FIG. 2.

Upper ejector pins 148, 150 engage upper ejector plate 152 and are retained by plate 154 (FIG. 1A). Ejector plate 152 and plate 154 are disposed between side rails 81 (FIG. 2). Ejector pins 148 extend downwardly through openings 156 in block 80 and their lower ends 158 engage the upper surface of block 98 when the mold is closed thus biasing ejector plate 152 and plate 154 upwardly against springs 160. Ejector pins 150 extend downwardly through openings 162 in block 80 and openings 164 in insert member 166. When the mold is opened by raising rods 60, upper platen 72 and upper mold assembly 78, springs 160 bias ejector plate 162 and plate 154 downwardly thereby biasing ejector pins 150 downwardly so as to strip molded structure 32 from bore plug 168 on insert 166.

Insert 166 is retained in recess 170 in block 80 by threaded fasteners 172 and completes mold cavity 122 when the mold is closed, as shown in FIG. 1A. Bore plug 168 extends downwardly from insert 166 through and in engagement with bore 42 of core and coil assembly 34 when the mold is closed. Plug 168 has reduced diameter lower end 174 which enters opening 124 in lower mold plug 104 when the mold is closed, defining a small clearance 176 therewith. Clearance 176 provides a vent in the bottom wall of mold cavity 122 for exhausting air therefrom as the mixture of particulate material and adhesive material is injected into the mold cavity. Opening 177 in mold plug 104 provides a vent for opening 124.

Insert 166 has a raised, truncated-triangular area 178 surrounding plug 168 (FIG. 3) which forms recess 180 in end 182 of the completed molded structure 32 (FIG. 9) for receiving a bearing assembly as more fully described in the aforesaid Dochterman and Wendt application. Openings 164 for ejector pins 150 extend through area 178. Insert 166 has another area 184 surrounding the raised area 178 which forms the remainder of end 182 of structure 32. Area 184 has a pair of openings 186 therein (FIG. 3) for receiving terminal prongs 50 of core and coil assembly 34.

Area 184 of insert 166 has gate 188 therein communicating with cavity 122 when the mold is closed for injecting the molding mixture into the mold cavity (FIG. 1A). Block 80 has a central recess 190 therein with which gate 188 communicates. Filling tube 192 has its lower end 194 closed by plate member 196. Lower end 194 of filling tube 192 and plate member 196 are seated in recess 190 in block 80. Plate member 196 has passage 198 therein communicating with the interior of filling tube 192. Gate 200 communicates between passage 198 and gate 188. Filling tube 192 and plate 196 are retained in recess 190 by threaded fasteners 202. Lower end 194 of filling tube 192 is surrounded by cooling water jacket 204 which defines cooling water passage 206. Water inlet and outlet conduits 208, 210 communicate with passage 206, partition 212 separating the inlet and outlet conduits (FIG. 6).

Filling tube 192 extends upwardly through clearance opening 214 in ejector plate 152 and plate 154, and through opening 216 in upper platen 72. The premixed mixture of particulate material and adhesive material is admitted to filling tube 192 adjacent its upper end 218 by flexible hose 220 connected to a pump (not shown) which delivers a measured quantity of the mixture into filling tube 192. Piston 224 actuated by pneumatic cylinder 226 mounted on upper plate 68 rapidly forces the molding mixture under pressure from filling tube 192 into mold cavity 122 at a substantially constant, uniform rate, and maintains the mixture under pressure in cavity 122 during hardening of the adhesive material. Cooling of the lower end 194 of filling tube 192 by circulating cooling water through passage 206 inhibits hardening of the molding material in filling tube 192 during hardening of the material in the mold cavity.

Mold plug 168 is heated by heating element 228 and block 80 is heated by heating elements 230. Guide pins 232 extending downwardly from block 80 and are received in mating openings 234 in block 98 when the mold is closed (FIGS. 2, 3 and 4). A second small vent opening 236 communicates with the side wall of mold cavity 122 adjacent ledge 126 at a point generally diametrically opposite gate 188 (FIG. 1A).

Referring now to FIG. 7, cylinder 226 is actuated to extend piston 224 rapidly to force the molding mixture under pressure from tube 192 into cavity 122 at a substantially constant, uniform rate and to maintain the mixture under pressure in the cavity for a predetermined time by timing system 238. Solenoid valve 240 having operating coil 242 is provided, valve 240 coupling air line 244 to cylinder 226 to extend piston rod 224 when coil 242 is energized, and to couple air line 244 to retract piston rod 224 when coil 242 is de-energized. Momentary actuation of "start" switch 246 couples timer motor 252 across potential source 250 thus energizing the timer motor and causing it to close its normally open contacts T, in turn energizing operating coil 248 of relay CR. Energization of operating coil 248 closes normally open relay contacts CR-1 and CR-2 thus sealing-in relay operating coil 248 and energizing solenoid valve operating coil 242 to extend piston rod 224 to inject a charge of material into mold cavity 122 and to maintain piston rod 224 extended so as to maintain the mixture in the cavity under pressure. When timer motor 252 is operated for a predetermined time, as will hereinafter be described, its contacts T open thus de-energizing relay operating coil 248 opening its contacts CR-1 and CR-2, in turn deenergizing solenoid valve operating coil 242 causing piston rod 224 to retract.

While the apparatus of FIGS. 1 through 7 has been shown as embodying a single cavity mold, it will be readily understood that the particular apparatus disclosed may readily have an additional mold cavity provided therein.

A wide range of inert particulate materials may be employed in the molding mixture used with the apparatus of the invention. The particulate material must withstand the elevated mold temperature and must not deleteriously affect the core and coil assembly. Further, the particulate material should be electrically nonconductive and non-magnetic. A number of different types of particulate materials are suitable for the particulate material such as mineral ores, various kinds of rocky material, and sand. In the particular case of molding a General Electric Company 51 frame, 2 watt shaded pole motor having the core and coil assembly shown in FIG. 8 with a 3/8 inch stack, the resulting structure being as shown in FIG. 9, silica sand was used, described as Wolf River sand, in co-pending U.S. Pat. application Ser. No. 180,770. The chemical composition of this is given in detail in U.S. Pat. application Ser. No. 180,770, the entire disclosure of which is incorporated herein by reference.

In the case of the aforesaid particular 51 frame motor, satisfactory results were obtained with a mixture formulated according to example 99 in my reference co-pending application although other compositions with different ratios of materials and different materials could also be used.

Many matrix formers are suitable and again such materials are described in my co-pending referenced application. The matrix material should economically hold the inert particles of the particulate material together as a substantially solid agglomerate structure and should not adversely affect the core and coil assembly and particularly the electrical insulation of the coils and leads, as well as withstand the elevated temperatures encountered during molding of the structure, and also during testing and use of the completed structure.

In the use of the apparatus of FIGS. 1 through 7, it was found desirable to preheat the core and coil assembly 34 from about 125° to about 150° C (257° – 302° F).

In the use of the apparatus of the invention, it has been found necessary to rapidly inject the molding mixture into the mold cavity at a substantially uniform, constant rate. Failure to inject the mixture into the mold cavity sufficiently rapidly results in premature curing of the adhesive material and/or incomplete filling of the cavity and separation of materials. Provision of the vents 176 and 236 were found to be necessary in order to permit the requisite desired filling of the mold cavity. In the case of the specific apparatus shown in FIGS. 1 through 7 for molding the aforesaid particular 51 frame motor, the width of vent 176 was approximately 0.0025 inch and the diameter of vent 236 was approximately 0.001 inch.

Figure 21:
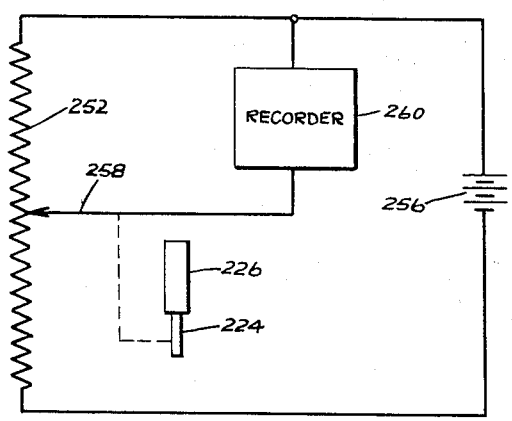
FIG. 21 is a schematic illustration showing the system employed for recording the material injection time and speeds.

Referring to FIG. 21, a system is shown which was employed for charting the speed of transfer of the molding mixture from filling tube 192 into the mold cavity 122. Linear potentiometer 254 was employed coupled across direct power supply 256 with its sliding element 258 actuated by piston 224 of cylinder 226 and coupled to recorder 260.

Figure 22:
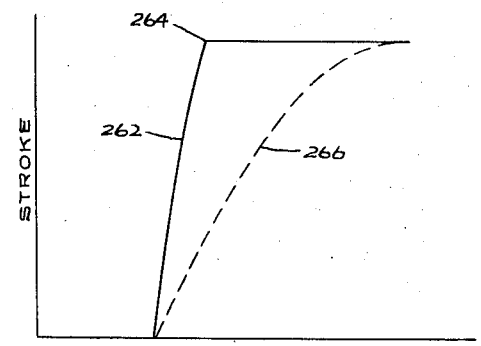
FIG. 22 is a diagram presented to show a preferred mode of material movement in the practice of the invention.

Referring to FIG. 22, there is shown a typical chart produced by recorder 260 which records the stroke of piston 224 against time. Plot 262 is illustrative of desirable injection action, it being observed that plot 262 has a sharp knee or corner 264 indicating that the material has been moved into the mold at a substantially constant rate. When the plot breaks sharply, as in the case of the plot 262, air in the mold cavity 122 apparently escapes ahead of the entering mixture and defects due to material separation or improper fill are reduced rather surprisingly. For example, where the plot does not break sharply, 22 percent of the articles formed have been observed to include separation or fill defects. By increasing venting area so that the injection curve then breaks sharply, no articles molded from later batches of the same nominal molding material composition exhibited separation or fill defects. Plot 266 is representative of unsatisfactory injection and shows that the molding material is moving at a non-uniform rate and that articles having observable defects due to separation/fill would be more likely to be observed.

It has been found that satisfactory operation is obtained with injection pressure, i.e., the pressure of the air in air line 244 which is applied to cylinder 226 and piston 224 and thus to the mixture in filling tube 192, from about 40 to about 150 P.S.I., with the injection time being about 50 to 100 milliseconds.

Insufficient injection speed tends to result in premature curing of the material which, in turn, seems to result in separation of the molding material ingredients. With non-uniform injection speed, the material is apparently curing before it completely encases the core and coil assembly. The mixture stops flowing but the matrix former in the mixture apparently still moves and results in undesired matrix material concentrations.

It has been found that mold temperatures from about 300° to about 425° F are suitable, 350° F being employed in the case of the aforesaid particular 51 frame motor. It has further been found that curing or hardening times of about 90 seconds to about 120 seconds are suitable, it being recalled that it is important that the mixture in the mold cavity be maintained under pressure during hardening and further that the mold remain closed at least until the mixture has reached its exothermic temperature. In the case of the aforesaid particular 51 frame motor with the mold maintained at 350° F, it was found that a curing time (mold closed) of 100 seconds produced a satisfactory structure with minimal cracking.

Preheating of the core and coil assembly prior to its positioning in the mold cavity and prior to injecting the molding mixture therein was found to be desirable in order to minimize cracking of the resulting structure around the exterior of the core. Without preheating the core and coil assembly, the core absorbs heat during the molding operation and expands, thus stressing the cross-section of material surrounding the periphery of the core. By preheating the core and coil assembly, the amount of expansion of the core is reduced thus reducing thermal stresses on the section of material surrounding the core.

Pressure is maintained on the mixture in the mold cavity during hardening by initially charging a sufficient amount of the mixture into the filling tube 192 so that some material remains in the filling tube with pressure being exerted thereon by piston 224 when the mold cavity 122 is filled. Cooling water passage 206 is provided in order to cool end 194 of the filling tube and thus to prevent premature curing of the mixture which remains in the filling tube following injection into the mold cavity. It has been found that if an insufficient quantity of the mixture remains in the filling tube so that pressure cannot be maintained thereon by piston 224, the resulting structure 32 appears to be porous and subject to cracking.

Referring now to FIGS. 10 through 20 in which like elements are indicated by like reference numerals and similar elements by primed reference numerals, there is shown (FIG. 10), generally indicated at 268, apparatus in accordance with the invention incorporating a four-cavity mold. Here, press bed or lower platen 56' is again supported by legs 58. Guide rods 270 extend upwardly from bed 56' with top plate 272 being secured to their upper ends by threaded fasteners 274. Bottom mold assembly 276 is supported on bed plate 56' and top mold assembly 278 is carried by top platen 280 guided for vertical movement by guide rods 270. Hydraulic cylinder 282 on top plate 272 moves top platen 280 and top mold assembly 278 between open (FIG. 10) and closed (FIG. 11) positions.

Figure 18:
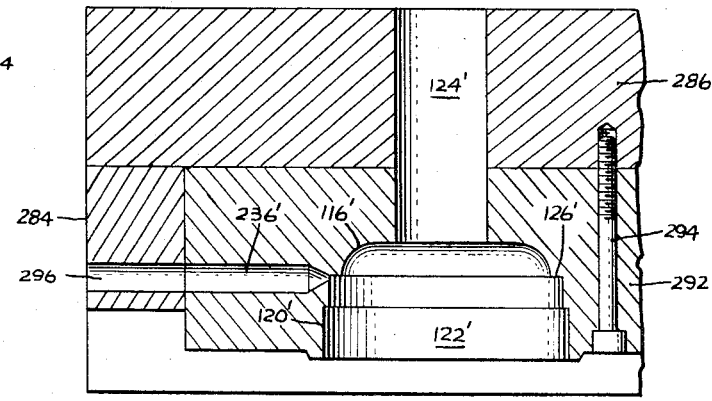
FIG. 18 is a fragmentary cross-sectonal view taken generally along the line 18—18 of FIG. 14.

Top mold assembly 278 comprises blocks 284, 286 mounted on top platen 280 by rails 288. Block 284 has a central cut-out portion 290 in which are seated four mold cavities blocks 282, blocks 292 being secured to block 286 by threaded fasteners 294 (FIG. 15). Each mold cavity block 292 has mold cavity 122' therein defined by bottom wall 116' and side wall 120' having ledge 126' thereon. Openings 124' in block 286 and blocks 292 communicate with bottom wall 116' of each mold cavity 122'. Each mold cavity block 292 has a vent opening 236' communicating with mold cavity 122' adjacent ledge 126', each vent opening 236' in turn communicating with and forming an extension of vent opening 296 in block 284 (FIG. 18).

Figure 16:
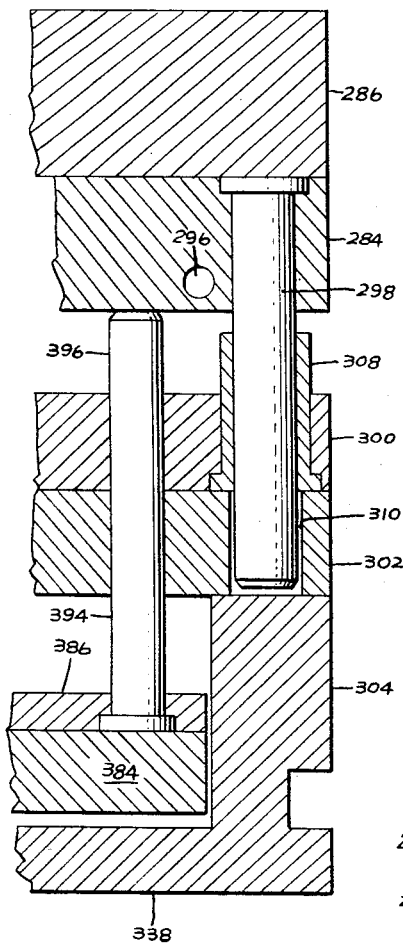
FIG. 16 is a fragmentary cross-sectional view taken generally along the line 16—16 of FIGS. 13 and 14.

Electric heating elements 128' are positioned in aligned openings 298 in mold cavity blocks 292 and block 286 (FIG. 15). Guide pins 600 are retained in block 284 (FIG. 16).

Bottom mold assembly 276 comprises blocks 300, 302 and 304 supported on bed plate 56' by rails 306. Guide pins 298 on top mold assembly 278 are received in bushings 308 in block 300 and openings 310 in block 302 when the mold is closed (FIG. 16).

Block 300 has four semi-circular recesses 312 formed in its upper surface mutually communicating with central recess 314. Insert members 316 are respectively seated in recesses 312, each of the insert members having bore plug portion 168'. Raised area 178' surrounds bore plug portion 168' on each of the insert members 316 for forming recess 180 in molded structure 32 (FIG. 9). Again, bore plug portion 168' enters and engages bore 42 of core 36 of core and coil assembly 34. Shoulder 318 on bore plug portion 168' is slightly spaced from bottom wall 116' of mold cavity 122' when the mold is closed thereby to form vent 176' (FIG. 15). Projection 320 on bore plug portion 168' has threaded portion 322 therein into which a tool may be threaded for removing insert members 316 from block 300.

Figure 17:
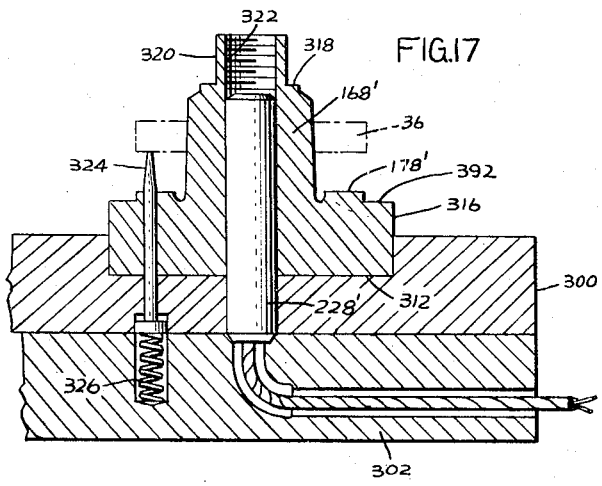
FIG. 17 is a fragmentary cross-sectional view taken generally along the line 17—17 of FIG. 13.

Electric heating elements 228' are positioned in aligned openings in block 300, insert members 316 and bore plug portions 168'. Pins 324 biased upwardly by springs 326 support core 36 and bias it against ledge 126' when the mold is closed (FIG. 17).

Filling tube 192' extends upwardly through opening 328 in bed plate 56', and openings 330, 332 and 334 in blocks 304, 302 and 300 (FIG. 15). Filling tube 192 is maintained in position by ring 336 welded thereto, ring 336 being secured to flange portion 338 of block 304 by threaded fasteners 340. Material charging tube 220' communicates with the interior of filling tube 192' through ring 336.

Upper end 194' of filling tube 192' is closed by plate member 342. Gates 188' extend through raised areas 178' of insert members 316 and communicate with openings 344 in plate 342 for injecting the molding mixture into cavities 122'. Piston 224' in filling tube 192' is actuated by hydraulic cylinder 226' suspended from bed plate 56' (FIGS. 10 and 11).

Figure 20:
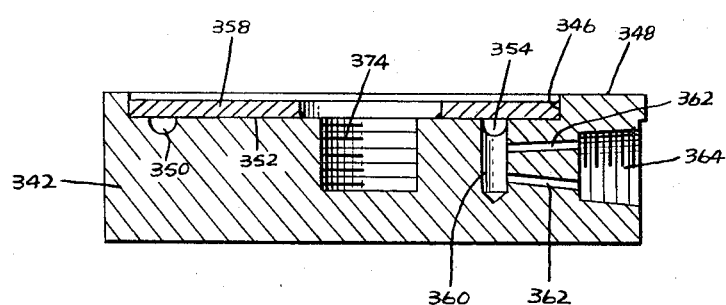
FIG. 20 is a cross-sectional view taken generally along the line 20—20 of FIG. 19.

Plate 342 is seated in central recess 314 in block 300. Referring particularly to FIGS. 15, 19 and 20, plate member 342 has recess 346 formed in its upper surface 348, the configuration of which is best seen in FIG. 19. A serpentine-shaped groove 350 is formed in bottom 352 of recess 346, groove 350 having inlet end 354 and discharge end 356. Plate 358 seated in recess 346 and retained therein, as by welding, closes groove 350 to define a cooling water passage. Drilled opening 360 communicates with inlet end 354 of groove 350, and passages 362 communicate between drilled opening 360 and tapped opening 364 in the side of plate 342. Drilled opening 366 communicates with discharge end 356 of groove 350, and passage 368 communicates between drilled opening 366 and tapped opening 364. Conduit 370 extends through an opening in block 300 and is threaded into tapped opening 364 in plate 342. An inner conduit 372 extends coaxially within conduit 370 and is forcibly inserted in opening 368. Cooling water is introduced into groove 350 through conduit 370, passages 362, drilled opening 360 and entrance end 354, and is discharged therefrom through discharge end 356, drilled opening 366 and conduit 372. Tapped opening 374 in plate 342 permits removal thereof by means of a threaded tool.

Figure 12:
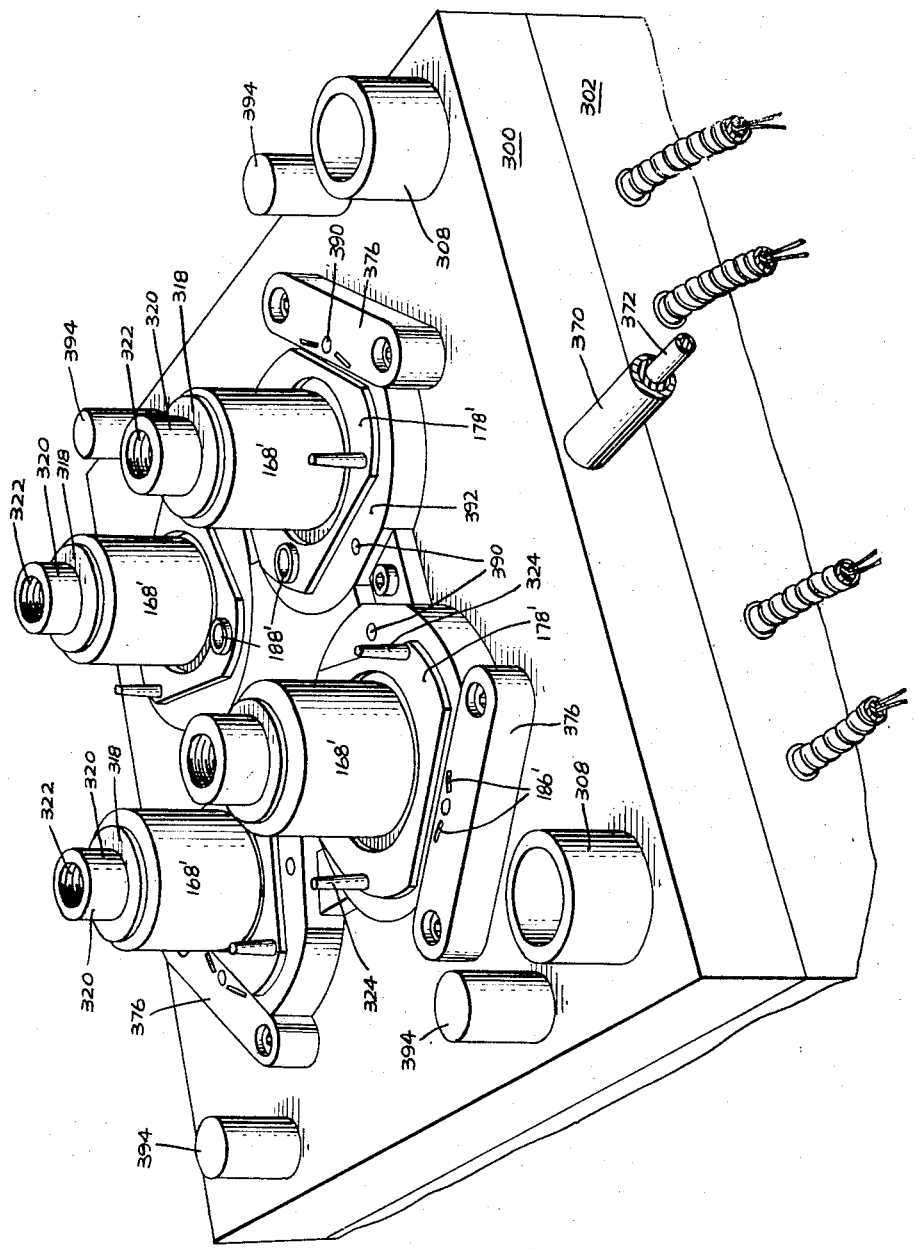
FIG. 12 is a view in perspective further illustrating the stationary mold part of the apparatus of FIGS. 10 and 11.
Figure 14:
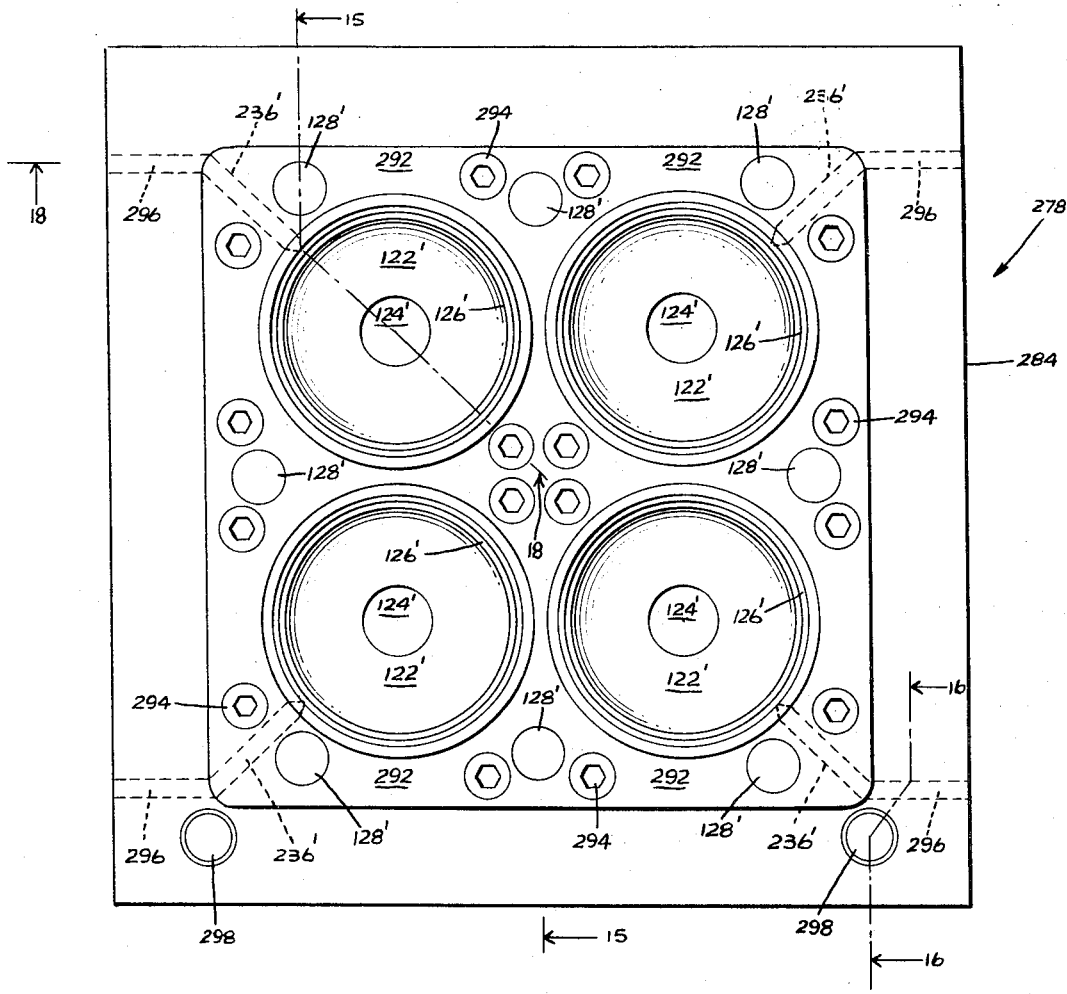
FIG. 14 is a bottom view of the movable mold part and mold cavity as viewed generally along the line 14—14 of FIG. 10.

Blocks 376 are seated in extensions 378 of recess 312 and block 300, being secured therein by threaded fasteners 380 (FIGS. 12, 13, 15). Each block 376 is seated in a milled notch 382, on the side of a respective insert member 316. Blocks 376 respectively have openings 186' therein for receiving terminal prongs 50 of core and coil assembly 34.

Ejector plate 384 and ejector pin retainer plate 386 are positioned between flange portion 338 of block 304 and block 302 and have central openings 388 through which filling tube 192' extends (FIG. 15). Ejector pins 390 are retained on ejector plate 384 by retainer plate 386 and extend upwardly through aligned openings in blocks 302 and 300. In the illustrated embodiment, there are three ejector pins 390 associated with each insert member 316 and bore block portion 168', one of these ejector pins 390 extending upwardly through an opening in the respective block 376 and the other two extending through area 392 of insert member 316 surrounding raised portion 178' (FIG. 13).

Ejector pins 394 are also retained on ejector plate 384 by retainer plate 386 and extend upwardly through aligned openings in blocks 300, 302 (FIGS. 13 and 16). The upper ends 396 of ejector pins 394 engage the bottom surface of block 284 and lower ejector plate 384, retainer plate 386 and ejector pins 390 when the mold is closed.

Ejector plate 384 has extension portions 400 extending on opposite sides of bottom mold assembly 276 (FIGS. 10 and 13). Blocks 402 are secured to extension portion 400, as by threaded fasteners 404. Blocks 402 are respectively engaged by blocks 406 having push rods 408 attached thereto and extending downwardly through openings in bed plate 56'.

Rods 410 have their upper ends attached to top platen 280 and extend downwardly through openings in bed plate 56'. Lower ends 412 of rods 410 extend freely downwardly through openings in plates 414 to which the lower ends of push rods 408 are attached. Springs 398 surround rods 410 and extend between plates 414 and bed plate 56'. It will now be seen that as top platen 280 is lowered by cylinder 282 to close the mold, rods 410 are lowered thus lowering plates 414 by gravity, rods 408, blocks 406 and 402 and ejector plate 384, engagement of upper end 396 of ejector pin 394 with the bottom surface of block 284 of top mold assembly 278 ensuring that ejector plate 384 and ejector pins 394 are lowered. When top platen 280 is raised by cylinder 282 to open the mold, a lost motion is provided, ejector plate 384 and ejector pins 290 remaining lowered until abutments 416 on lower ends 412 of rods 410 come into engagement with plates 414. At this point, the remaining upward travel of top platen 280 and rods 410 results in upward movement of plates 414, rods 408, blocks 406 and 402, ejector plate 384 and ejector pins 390 thereby to eject the finished structures 32 from bore plug portions 168'.

It will be readily understood that the above-described molding method may be practiced with single or plural cavity molding apparatus. It will also be appreciated that in a preferred form, molding material is moved upwardly through a transition passageway into one or more sprues. In this manner, gravity will prevent molding material from inadvertently moving along the transition passageway while the mold cavity is open.

It will further be understood that while the apparatus and method of the invention has been particularly illustrated and described in connection with the molding of the core and coil assembly of a particular motor, the apparatus and method of the invention is equally applicable to the molding of core and coil assemblies for other dynamoelectric machines and for other electrical apparatus such as transformers, ballasts, reactors, solenoids and the like.

Further, it will be understood that commercially available control means would be used in known fashion for controlling the operational sequence of the illustrated apparatus, as will be understood by persons skilled in the art. Preferably, such control means include, when utilized with the illustrated embodiments, means for adjusting injection pressure, mold part temperatures, an elapsed time during which the mold parts are held closed to define or establish one or more substantially closed cavities.

While there have been described above the principles of this invention in connection with specific apparatus and methods, it is to be clearly understood that this description is made only by way of example and not as a limitation to the scope of the invention.

What we claim as new and desire to secure by Letters Patent of the United States is:

1. Apparatus for making a molded electrical structure which comprises a bore defining stator core and coil assembly with at least a portion thereof at least partially embedded in a substantially rigid and solid interstitial mass of inert particulate material secured together and to at least a portion of the assembly by a hardened matrix forming material, the mass forming a protective covering for at least a part of the assembly and initially being a flowable molding composition, said apparatus comprising: a plurality of mold parts including first and second mold parts, the first mold part having at least one surface for establishing at least part of at least one substantially closed cavity region for molding at least a part of the interstitial mass; a second mold part having at least one surface for establishing at least part of the at least one substantially closed cavity region; means for effecting relative movement of said mold parts thereby to selectively establish the at least one substantially closed cavity region; means for supporting a core and coil assembly in the at least one substantially closed cavity region; a bore plug extending from at least one of the mold parts and disposed within the closed cavity region at least when the substantially closed cavity region is established; one of said mold parts having at least one discharge passage therein communicating at least with the at least one substantially closed cavity region for admitting molding composition thereto; at least one transition passageway for admitting molding composition to the discharge passage; at least one filling tube in communication with the at least one transition passageway; means for venting the at least one substantially closed cavity region to thereby assist in complete filling of the at least one closed cavity region without separation of molding composition constituents when molding composition is forced thereinto means for rapidly forcing molding composition under pressure from the at least one filling tube through the at least one transition passageway and the at least one discharge passage into the at least one substantially closed cavity at a substantially constant and uniform rate preselected to at least assist in completely filling the at least one substantially closed cavity region with unseparated molding composition and for maintaining a pressure on molding composition in the at least one substantially closed cavity region during hardening of the composition into a substantially solid mass; means for heating at least one of said mold parts and said bore plug thereby to elevate the temperature associated with the substantially closed cavity region and to shorten the time required for molding composition within the substantially closed cavity region to harden into a substantially solid mass; and means for cooling the at least one transition passageway thereby to maintain the temperature of molding composition adjacent to the at least one transition passageway below a preselected hardening temperature and to inhibit transfer of heat from the mold parts to the at least one filling tube.

2. The apparatus of claim 1 wherein said means for venting includes at least one air exhausting passage formed in a wall defining a side portion of the at least one substantially closed cavity region and at least one other air exhausting passage established along another wall of the at least one substantially closed cavity region.

3. The apparatus of claim 1 wherein the at least one filling tube has a first end communicating with the at least one transition passageway, and said means for cooling includes jacket means for circulating a liquid coolant in heat transfer relationship with the first end of the at least one filling tube.

4. The apparatus of claim 3 wherein said means for circulating a coolant includes a plate disposed at said first end of the at least one filling tube, the plate having coolant passages formed therein having the at least one transition passageway formed therein and having at least a part of the at least one discharge passage formed therein.

5. The apparatus of claim 1 wherein the core and coil assembly includes a pair of upstanding terminals connected to the coil portion thereof, at least one of the mold parts includes recess defining means for respectively snugly receiving core and coil assembly terminals when the mold parts are closed thereby to prevent damage to the terminals during closure of the mold parts.

6. The apparatus of claim 1 wherein said means for heating includes a heating element disposed in said at least one bore plug.

* * * * *

PO-1050
(5/69)

UNITED STATES PATENT OFFICE
CERTIFICATE OF CORRECTION

Patent No. 3,762,847                    Dated October 2, 1973

Inventor(s) Thomas F. Deuter and Dean E. Shaffer

It is certified that error appears in the above-identified patent and that said Letters Patent are hereby corrected as shown below:

In column 1, line 14, delete "and"

In column 1, line 15, delete "methods"

In column 2, line 27, change "methods" to --approaches--

In column 2, line 46, delete "and methods"

In column 2, line 50, delete "and method"

In column 2, line 56, delete "and methods"

In column 2, line 58, delete "and methods"

In column 2, line 62, delete "and methods"

In column 3, line 40, change "By a further aspect of the invention, an improved" to --In carrying out the invention, one approach--

In column 3, line 41, delete "method"

In column 6, line 20, change "162" to --152--

In column 10, line 10, change "cavities blocks 282" to --cavity blocks 292--

UNITED STATES PATENT OFFICE
CERTIFICATE OF CORRECTION

Patent No. 3,762,847      Dated October 2, 1973

Inventor(s) Thomas F. Deuter and Dean E. Shaffer

It is certified that error appears in the above-identified patent and that said Letters Patent are hereby corrected as shown below:

In column 11, line 27, change "382, on" to --382 in--

In column 12, line 22, delete "the"

In column 12, line 23, delete "and"

In column 12, line 23, change "method of" to --embodying--

In column 12, line 25, delete "the" (second occurrence)

In column 12, line 26, change "and method of" to --embodying--

In column 12, line 38, change "an" to --and--

In column 12, line 43, delete "and methods"

Signed and sealed this 26th day of November 1974.

(SEAL)
Attest:

McCOY M. GIBSON JR.
Attesting Officer

C. MARSHALL DANN
Commissioner of Patents